US012812352B2

(12) United States Patent
Wu et al.

(10) Patent No.: US 12,812,352 B2
(45) Date of Patent: Nov. 24, 2026

(54) RADIO HIGH-SPEED TRAIN MODE DETERMINATION AND FALSE ALARM SUPPRESSION

(71) Applicant: QUALCOMM Incorporated, San Diego, CA (US)

(72) Inventors: Yongle Wu, San Diego, CA (US); Jiaheng Liu, Shanghai (CN); Shanshan Wang, San Diego, CA (US); Nanrun Wu, Beijing (CN); Ashok Mantravadi, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/698,766

(22) PCT Filed: Dec. 10, 2021

(86) PCT No.: PCT/CN2021/137031
§ 371 (c)(1),
(2) Date: Apr. 4, 2024

(87) PCT Pub. No.: WO2023/102886
PCT Pub. Date: Jun. 15, 2023

(65) Prior Publication Data
US 2024/0414516 A1 Dec. 12, 2024

(51) Int. Cl.
*H04W 84/00* (2009.01)
*H04W 8/02* (2009.01)
*H04W 76/38* (2018.01)

(52) U.S. Cl.
CPC ............ *H04W 8/02* (2013.01); *H04W 76/38* (2018.02); *H04W 84/005* (2013.01)

(58) Field of Classification Search
CPC . G01S 11/00; H04W 24/08; H04W 36/00833; H04W 36/32; H04W 4/42;
(Continued)

(56) References Cited

U.S. PATENT DOCUMENTS

2007/0032238 A1 2/2007 Kim et al.
2009/0163206 A1 6/2009 Adatrao et al.
(Continued)

FOREIGN PATENT DOCUMENTS

CN 108391290 A 8/2018

OTHER PUBLICATIONS

Supplementary European Search Report—21966808—Search Authority—Munich—Apr. 14, 2025.
(Continued)

*Primary Examiner* — Robert J Lopata
(74) *Attorney, Agent, or Firm* — ArentFox Schiff LLP

(57) ABSTRACT

Aspects are provided which allow a UE to apply new radio high-speed train mode determination and false alarm suppression in HST deployments. The UE combines a plurality of indications associated with a high-speed train (HST) mode detection into a consolidated HST mode configuration signal. The UE determines whether to suppress the consolidated HST mode configuration signal based on a mobility metric of the UE and a plurality of thresholds. The UE transitions into a HST mode when the consolidated HST mode configuration signal is not suppressed based on the mobility metric of the UE exceeding at least one of the plurality of thresholds. As a result, false HST mode flags may be avoided and HST mode detection success rates may thereby be improved.

27 Claims, 7 Drawing Sheets

(58) Field of Classification Search
CPC ... H04W 48/16; H04W 64/006; H04W 76/38; H04W 8/02; H04W 84/005; H04W 88/02; H04W 88/06
See application file for complete search history.

(56) References Cited

U.S. PATENT DOCUMENTS

| | | | | |
|---|---|---|---|---|
| 2016/0373994 | A1 | 12/2016 | Yiu et al. | |
| 2017/0311266 | A1 | 10/2017 | Yang et al. | |
| 2018/0213595 | A1* | 7/2018 | Lee | H01Q 1/3216 |
| 2020/0128467 | A1 | 4/2020 | Gao et al. | |
| 2021/0306864 | A1* | 9/2021 | Park | H04B 7/0617 |
| 2023/0116740 | A1* | 4/2023 | Niu | H04W 36/32 370/331 |
| 2024/0073807 | A1* | 2/2024 | Wang | H04W 48/20 |
| 2024/0098606 | A1* | 3/2024 | Li | H04W 56/0015 |
| 2025/0126568 | A1* | 4/2025 | Song | H04W 36/36 |

OTHER PUBLICATIONS

Apple: "Discussion on the Signaling Characteristic Requirement in FR2 HST RRM", 3GPP tsg_ran\wg4_radio, R4-2117303, Oct. 23, 2021, (Oct. 23, 2021), 2 Pages, The Whole Document.
International Search Report and Written Opinion—PCT/CN2021/137031—ISA/CN—Sep. 14, 2022.

* cited by examiner

RADIO HIGH-SPEED TRAIN MODE DETERMINATION AND FALSE ALARM SUPPRESSION

CROSS REFERENCE TO RELATED APPLICATION(S)

This application is a National Phase entry of PCT Application No. PCT/CN2021/137031, entitled "NEW RADIO HIGH-SPEED TRAIN MODE DETERMINATION AND FALSE ALARM SUPPRESSION" and filed on Dec. 10, 2021, which is expressly incorporated by reference herein in its entirety.

BACKGROUND

Technical Field

The present disclosure generally relates to communication systems, and more particularly, to new radio high-speed train mode determination and false alarm suppression.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE combines a plurality of indications associated with a high-speed train (HST) mode detection into a consolidated HST mode configuration signal. The UE determines whether to suppress the consolidated HST mode configuration signal based on a mobility metric of the UE and a plurality of thresholds. The UE transitions into a HST mode when the consolidated HST mode configuration signal is not suppressed based on the mobility metric of the UE exceeding at least one of the plurality of thresholds.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
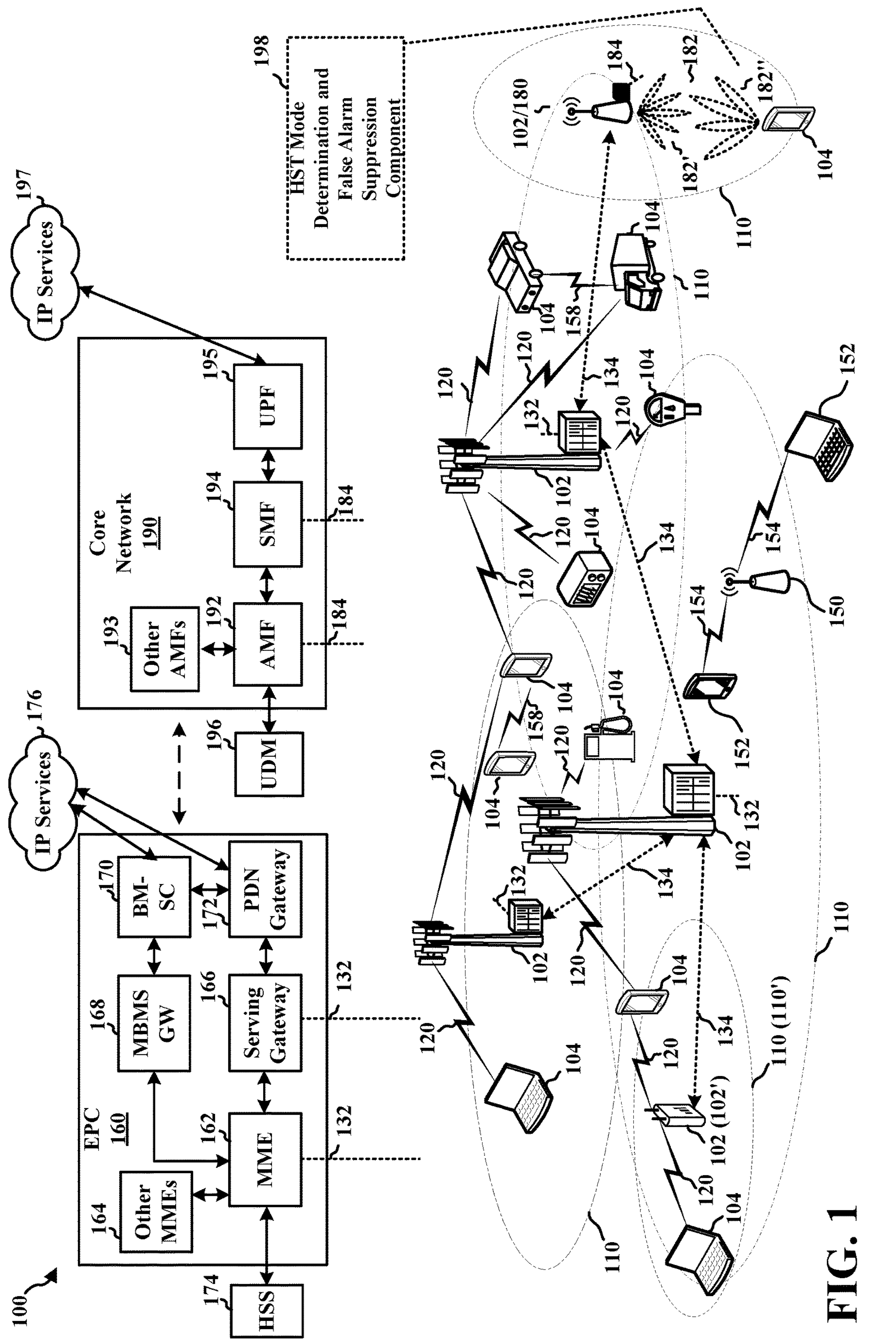
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some access networks, user equipment (UE) may be used in some scenarios in which the UE is highly mobile— that is, the UE may be traveling at a high rate of speed, such as in a train, helicopter, automobile, etc., such that the geographic location of the UE may be changing relatively rapidly. For example, a UE be present on a train in which network access is available through high-speed train (HST) deployments (although other similar deployments are possible without departing from the scope of the present disclosure). One scenario in which UE modem performance may be observed are in HST deployments. An HST deployment is a critical area for modem performance.

HSTs have recently developed as fast, convenient, environmentally friendly, and flexible means of transportation. As more and more passengers carrying UEs tend to travel on HSTs, new challenges have arisen in providing reliable communication services to accommodate growing communication demands. For example, typical HSTs may travel at speeds upwards of 200 kilometers per hour (km/h) or even upwards of 350 km/h, resulting in frequent and fast handovers, large Doppler spreads, and other effects. In attempt to overcome these challenges, millimeter-wave (mmW) and massive multiple-input multiple output (MIMO) technologies, as well as coordinated multipoint (COMP) and mobile relay station architectures, have been considered for HST deployments.

A UE may have different design algorithms tailored for different HST deployment scenarios and, hence, the UE may need some form of HST indications to trigger the UE to transition into an HST mode and operate properly within an HST deployment scenario. These indications may originate from a network as downlink flags, or in the absence of flags, the UE may have internal means to determine the HST indications.

However, notwithstanding such technologies, conventional HST deployments may still be insufficient in covering all possible scenarios that may arise in HSTs, including the modem performance described above. There are use cases where a UE camps on an HST cell (e.g., cells served by base stations located in or on a HST); however, the UE is not in motion (i.e., the UE is not traveling at a high rate of speed, as on an HST). Rather, the UE is in a stationary position (e.g., the UE is located in a waiting room of a train station or located by the side of an HST track), where the HST flags falsely trigger the UE to transition into the HST mode. For example, UEs that are located outside or away from a HST (referred to herein as non-HST UEs) may be camped on HST cells. As these HST cells have originally been designed to support UEs that are located in or on a HST (referred to herein as HST UEs), the base stations serving these HST cells may send HST indications to non-HST UEs that falsely trigger the UE to transition into the HST mode. Hence, it would be helpful to avoid false alarms that falsely trigger the UE into an HST mode in order to improve the robustness of HST mode detection in non-HST UEs.

Aspects of the present disclosure allow a UE to consolidate the number of HST flags originating from multiple sources and suppressing any false alarms among the HST flags in order to robustly determine the HST mode when the UE is in fact in motion. As a result, false HST mode flags may be avoided and HST mode detection success rates and robustness may thereby be improved.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHZ-300 GHz) which is identified by the International Telecommunications Union (ITU) as a “millimeter wave” band.

With the above aspects in mind, unless specifically stated otherwise, it should be understood that the term “sub-6 GHz” or the like if used herein may broadly represent frequencies that may be less than 6 GHZ, may be within FR1, or may include mid-band frequencies. Further, unless specifically stated otherwise, it should be understood that the term “millimeter wave” or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a HST mode determination and false alarm suppression component 198 that is configured to combine a plurality of indications associated with a high-speed train (HST) mode detection into a consolidated HST mode configuration signal. The HST mode determination and false alarm suppression component 198 is also configured to determine whether to suppress the consolidated HST mode configuration signal based on a mobility metric of the UE and a plurality of thresholds. The HST mode determination and false alarm suppression component 198 is further configured to transition the UE 104 into a HST mode when the consolidated HST mode configuration signal is not suppressed based on the mobility metric of the UE exceeding at least one of the plurality of thresholds.

Figure 2B:
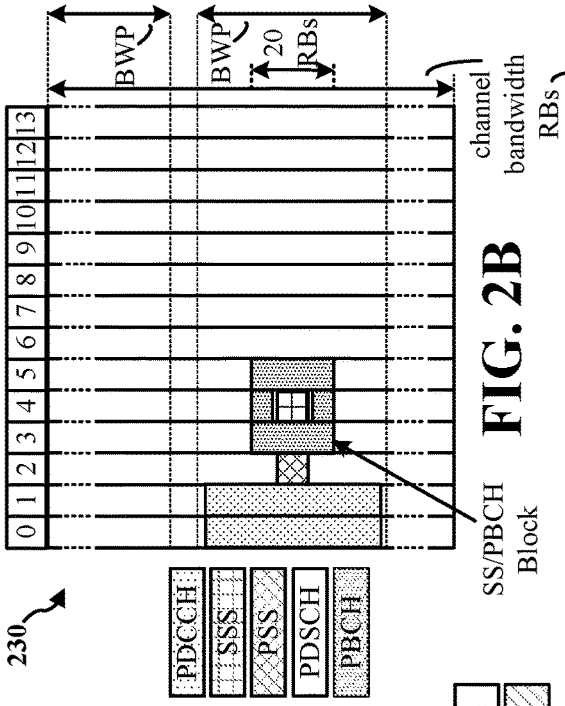
FIG. 2B is a diagram illustrating an example of DL channels within a subframe, in accordance with various aspects of the present disclosure.
Figure 2A:
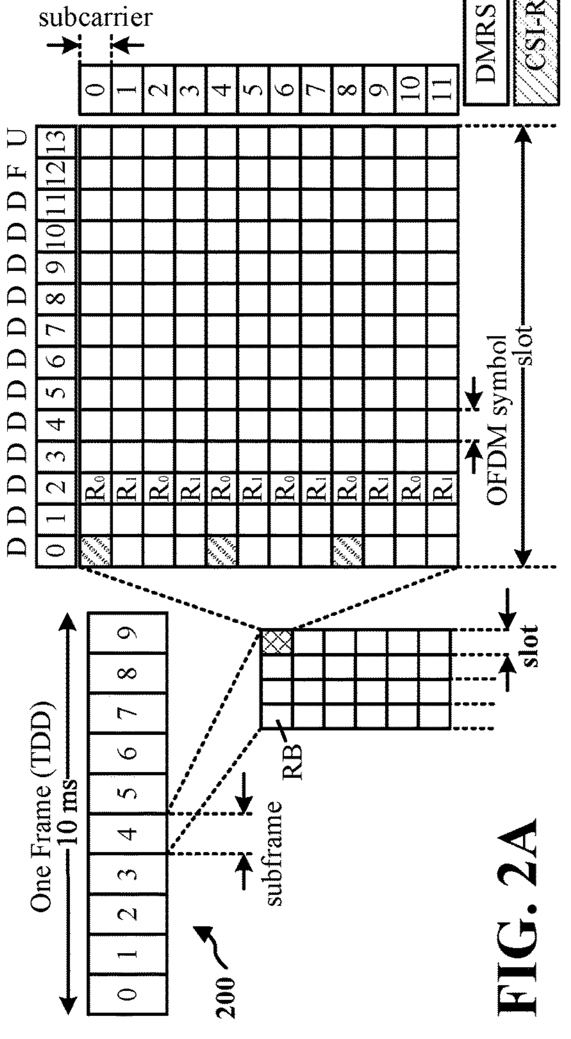
FIG. 2A is a diagram illustrating an example of a first frame, in accordance with various aspects of the present disclosure.
Figure 2D:
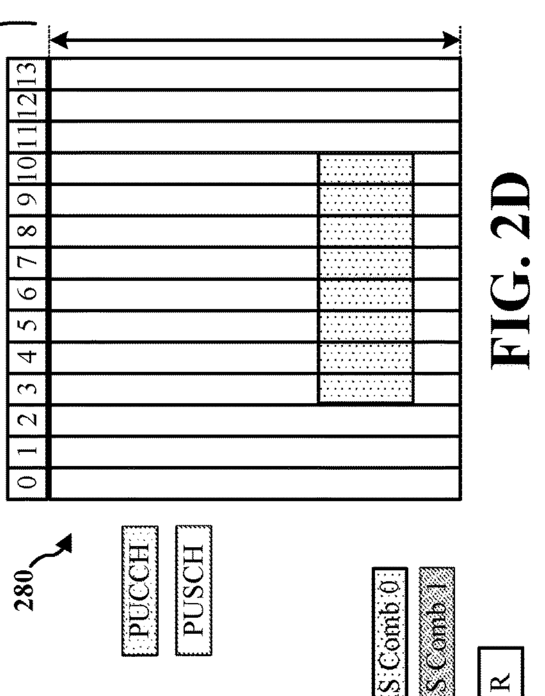
FIG. 2D is a diagram illustrating an example of UL channels within a subframe, in accordance with various aspects of the present disclosure.
Figure 2C:
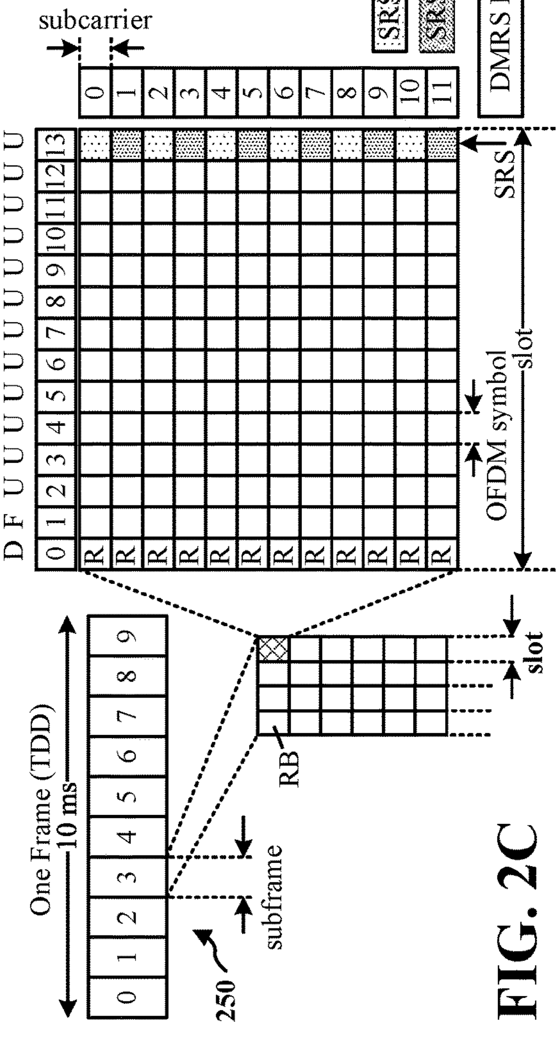
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 24 slots/subframe. The subcarrier spacing and symbol length/duration are a function of the numerology. The subcarrier spacing may be equal to $2^{a}$ *15 kilohertz (kHz), where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
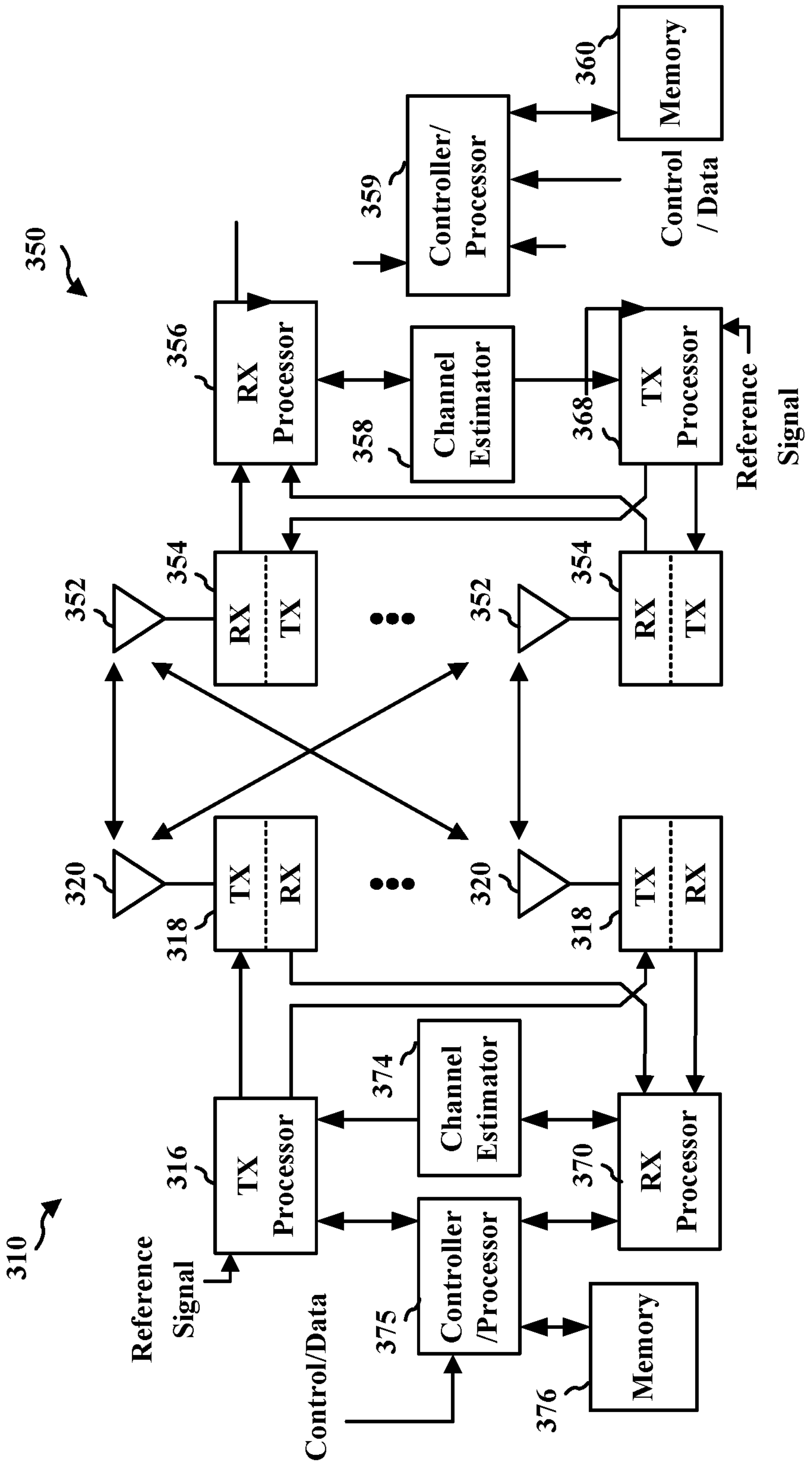
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with HST mode determination and false alarm suppression component 198 of FIG. 1.

As described above, an HST deployment is a critical area for modem performance. A UE may have different design algorithms tailored for different HST deployment scenarios and, hence, the UE may need some form of HST indications to trigger the UE to transition into an HST mode and operate properly within an HST deployment scenario. These indications may originate from a network as downlink flags, or in the absence of flags, the UE may have internal means to determine the HST indications.

However, notwithstanding such technologies, conventional HST deployments may still be insufficient in covering all possible scenarios that may arise in HSTs, including the modem performance described above. There are use cases where a UE camps on an HST cell; however, the UE is not in motion (i.e., the UE is not traveling at a high rate of speed, as on an HST). Rather, the UE is in a stationary position (e.g., the UE is located in a waiting room of a train station or located by the side of an HST track), where the HST flags falsely trigger the UE to transition into the HST mode. For example, UEs that are located outside or away from a HST (referred to herein as non-HST UEs) may be camped on HST cells. As these HST cells have originally been designed to support UEs that are located in or on a HST (referred to herein as HST UEs), the base stations serving these HST cells may send HST indications to non-HST UEs that falsely trigger the UE to transition into the HST mode. Hence, it would be helpful to avoid false alarms that falsely trigger the UE into an HST mode in order to improve the robustness of HST mode detection in non-HST UEs.

Aspects of the present disclosure allow a UE to consolidate the number of HST flags originating from multiple sources and suppressing any false alarms among the HST flags in order to robustly determine the HST mode when the UE is in fact in motion. As a result, false HST mode flags may be avoided and HST mode detection success rates and robustness may thereby be improved.

Figure 4:
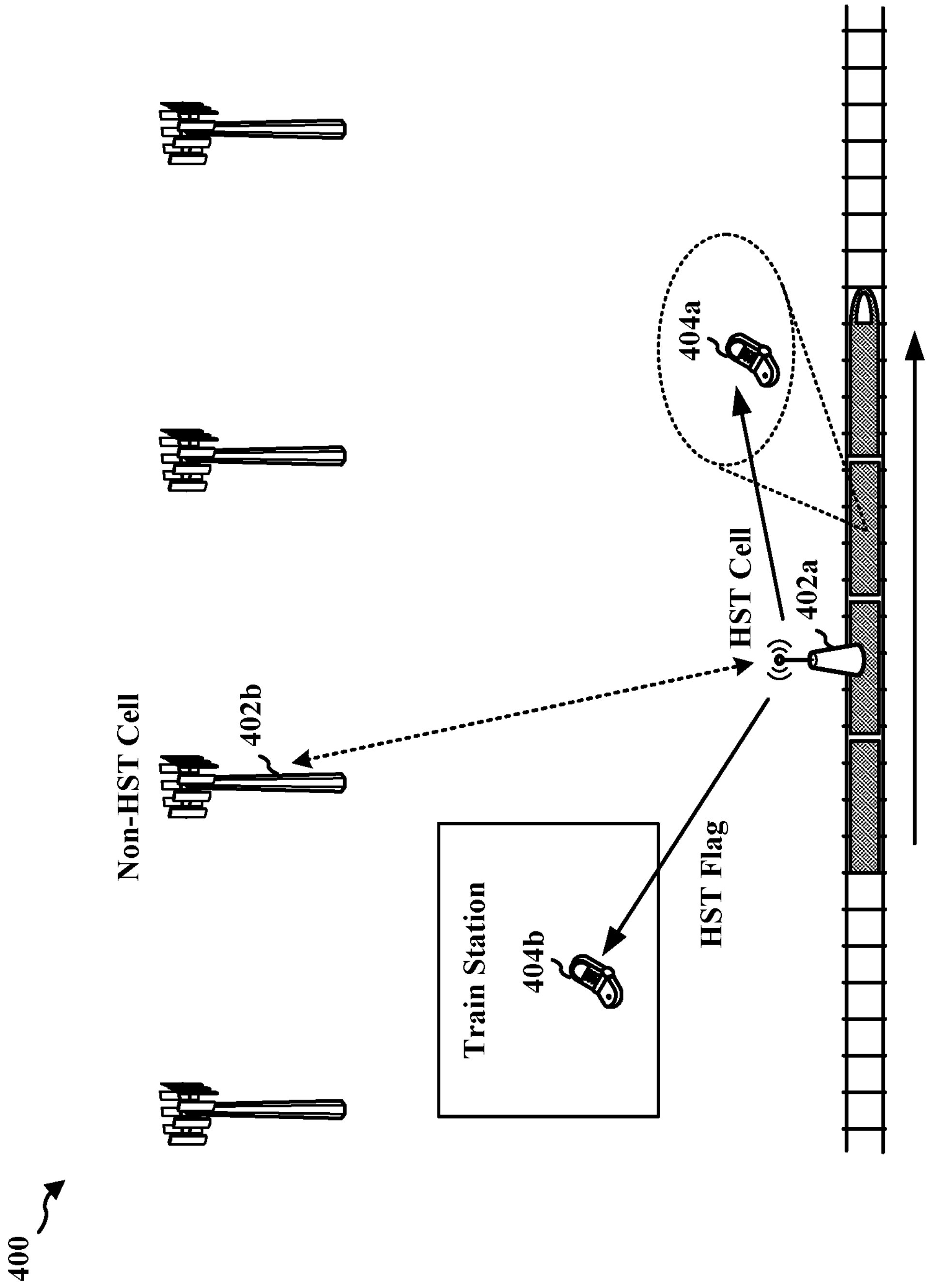
FIG. 4 is a diagram illustrating an example of a high-speed train deployment.

FIG. 4 illustrates an example 400 of a HST deployment. UEs on a HST (HST UEs 404a) may communicate with a base station 402a in a HST cell. The base station 402a may also communicate with UEs outside of the HST (non-HST UEs 404b). For example, UEs located outside or away from a HST (non-HST UEs 404b) may communicate with the base station 402a in a HST cell. For example, the UE 404b may be located in a waiting room of a train station or located by the side of an HST track. In some aspects, the base station 402a in the HST cell may communicate with a base station 402b in a non-HST cell.

Aspects of the present disclosure describe how a base station (e.g., 402a, 402b) provides a HST configuration to a UE (e.g., 404a, 404b) to detect a HST scenario. In a first aspect, the base station 402a may generate the HST configuration based on HST deployment information, where the operator knows the base station 402 is to serve HST. The HST configuration may set static HST flags at the UE 404a for the UE 404a to detect an HST scenario and activate the HST mode. The HST configuration may be sent in system information blocks (SIBs) via radio resource control (RRC) signaling. After the HST mode is activated at the UE 404a, the base station 402a and the UE 404a may enter special procedures (e.g., handover, cell reselection, beam management) that are different from procedures for a normal mode.

In an aspect of the present disclosure, the UE 404a may locally detect the HST scenario. After detecting the HST scenario, the UE 404a may transition into the HST mode. There are a variety of ways a UE can detect the HST scenario. Any combination of the following options may be employed. In a first option, received downlink signals (e.g., SSB, CSI-RS, etc.) can be analyzed. For example, Doppler shift may be measured to determine the UE speed. In another option, a downlink signal strength may be monitored for multiple cells (e.g., HST cells, non-HST cells). The speed can be determined based on the change in signal strength between the two (or more) cells. In yet another option, the UE speed can be determined based on a pattern of detected wireless links (e.g., received signal strength variation of SSBs from one or more cells). Based on a comparison of these patterns, the UE can estimate its speed. The UE could additionally consider the signal strength pattern associated with an additional cell to further refine the speed estimate. In still another option, a UE may determine whether it is in a high speed train scenario with UE sensors. For example, the UE may estimate its speed based on GPS or motion/speed sensors.

In yet another option, a UE may determine it is in a HST scenario by recognizing application level indicators. For example, an application triggered by a user may inform the UE of the HST scenario. The user may turn on "Train mode" (similar to airplane mode) on the UE. In another example, the user may run a specific application designed to provide improved service on high-speed trains. In each of these cases, the UE would recognize it is in the HST mode, based on the application level indicators.

In some implementations, the UE can toggle back to the normal mode when the UE leaves the HST scenario. For example, the UE 404a may detect it is no longer in the HST scenario.

As illustrated in FIG. 4, the UE 404b camps on an HST cell via base station 402a; however, the UE 404b is not in motion (i.e., the UE 404b is not traveling at a high rate of speed, as on a HST). Rather, the UE 404b is in a stationary position (e.g., the UE is located in a waiting room of a train station), where the HST flags falsely trigger the UE 404b to transition into the HST mode. For example, UEs that are located outside or away from a HST may be camped on HST cells. As these HST cells have originally been designed to support UEs that are located in or on a HST, the base stations serving these HST cells may send HST indications to non-HST UEs that falsely trigger the UE to transition into the HST mode. Hence, it would be helpful to avoid false alarms that falsely trigger the UE 404b into an HST mode in order to improve the robustness of HST mode detection in non-HST UEs.

To resolve this issue, aspects of the present disclosure allow a UE to consolidate the number of HST flags originating from multiple sources and suppressing any false alarms among the HST flags in order to robustly determine the HST mode when the UE is in fact in motion. As a result, false HST mode flags may be avoided and HST mode detection success rates and robustness may thereby be improved.

Figure 5:
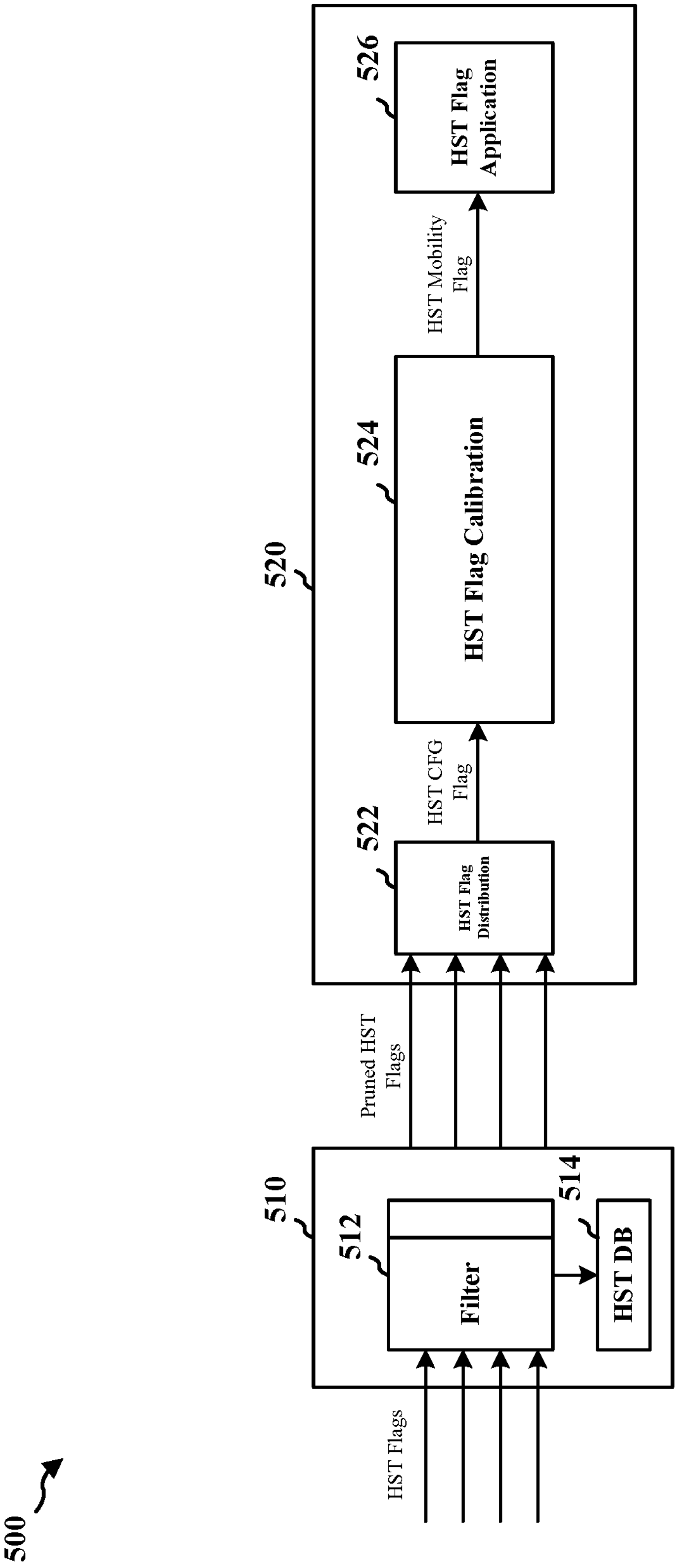
FIG. 5 is a diagram illustrating an example of data flow for HST mode determination and false alarm suppression.

FIG. 5 is a diagram 500 illustrating an example data flow for HST mode determination and false alarm suppression. The diagram 500 may be, or at least a part of, a UE (e.g., UE 104, 350, 404a-b). The diagram 500 includes a layer 2 module 510 and a layer 1 module 520. The layer 2 module 510 includes a filter 512 and a database 514. The layer 1 module 520 includes a HST flag distribution module 522, a HST flag calibration module 524, and a HST flag application module 526.

In one or more implementations, the layer 2 module 510 can receive multiple HST flags (denoted as "HST flags") that originate from different sources in order to inform the UE that it is in a HST mode. In some aspects, the HST flags includes a first subset of HST flags associated with downlink signaling from a base station. For example, the UE may receive a HST measurement flag via downlink signaling from a base station (e.g., 102/180, 310, 402a-b). The HST measurement flag may indicate that the UE is in the HST mode based on one or more measurements of the UE obtained by the base station. In another example, the UE may receive a HST demodulation flag via downlink signaling from a base station. The HST demodulation flag may indicate that the UE is in the HST mode based on a demodulation pattern associated with the UE. In another example, the UE may receive an NR inter-radio access technology (IRAT) HST flag through LTE configuration or via downlink signaling from a base station. The NR IRAT HST flag may indicate that the UE is in the HST mode based on an IRAT detection. The HST flags also may include a second subset of HST flags associated with one or more HST detection schemes performed at the UE. Other HST flags may include those flags that may be a carryover of LTE flags to NR. For example, some of these other HST flags may be related to E-UTRAN NR Dual Connectivity (ENDC), handover or redirection between NR and LTE, fast return to NR after evolved packet system (EPS) fallback, among others. The other HST flags also may be based on infra alignment. The other HST flags also may relate to decisions from sensors (e.g., camera, Radar, light, etc.) and/or global navigation satellite system (GNSS).

The filter 512 may apply one or more filters that selectively enable certain HST flags to pass through to the layer 1 module 520 for further processing as a subset of pruned HST flags. In some aspects, the subset of pruned HST flags respectively correspond to the plurality of indications associated with the HST mode detection. In some implementations, the number of filters being applied to the HST flags may be programmable such that a select number of HST flags can be disabled. In some aspects, a timer may be applied on certain HST flags (e.g., those that are determined locally at the UE or non-network flags). In this regard, the UE may determine whether the second subset of HST flags are considered valid based on a status of the timer. For example, prior to the timer expiring, the non-network HST flags are considered valid and pass through as part of the subset of pruned HST flags. In some aspects, the UE may select the one or more of the second subset of HST flags for inclusion into the subset of pruned HST flags when the timer is not expired. Otherwise, the UE will no longer consider the non-network HST flags valid upon expiry of the timer and are filtered out. For example, the UE may refrain from selecting one or more of the second subset of HST flags for inclusion into the subset of pruned HST flags when the timer is expired. In other implementations, the filter 512 may apply a weighting scheme between the network-based HST flags and non-network HST flags such that the filter 512 selects between the network-based HST flags and the non-network HST flags for inclusion into the subset of pruned HST flags. In this regard, the subset of pruned HST flags includes the selected one or more HST flags.

The database 514 can store control information from the filter 512 such as a record of the filters being applied and/or store data information from the filter 512. For example, the database 514 may store information relating to prior cell selections indicating multiple frequencies so that a UE having a radio link failure can refer back to the database 514 to determine the next cell reselection. In some aspects, information from the database 514 can be used to set the filters such that HST-related frequencies are prioritized over other frequencies for a potential transition of the UE into the HST mode. The output of the filter 512 (denoted as "pruned HST flags") is provided to the HST flag distribution module 522.

The HST flag distribution module 522 can collect all information and attempt to consolidate the subset of pruned HST flags into a consolidated HST mode configuration signal (denoted as "HST CFG flag"). The HST flag distribution module 522 has options to consider a subset of the pruned HST flags or consider them all for consolidation. In some aspects, the HST flag distribution module 522 may apply additional filters different than those applied in the filter 512. In other aspects, the HST flag distribution module 522 may apply one or more rules that help with filtering out certain flags not being considered. In some implementations, the HST flag distribution module 522 may consolidate the received HST flags by applying a logical operation (e.g., AND, OR, XOR, etc.) that reduces the number of received HST flags down to a single HST flag (referring to the consolidated HST mode configuration signal). The consolidated HST mode configuration signal is then fed to the HST flag calibration module 524.

The flag calibration module 524 can be used to suppress any false alarm flags that falsely indicate the UE is in a HST mode but the UE is not in motion. In some aspects, the flag calibration module 524 may determine whether to suppress the consolidated HST mode configuration signal based on a mobility metric of the UE and a plurality of thresholds. In some aspects, the mobility metric may refer to a number of cell switch occurrences of the UE. For example, the UE may count the number of cell switch occurrences in real time over a programmable duration of time, of which the number of cell switch occurrences may refer to any occurrence of a handover of the UE or cell reselection by the UE. In some aspects, the UE may read a buffer that stores a historical record of the number of cell switch occurrences over a past duration of time. For example, the UE may check the buffer for the number of cell switch events that occurred over the past 60 seconds. For purposes of comparing the mobility metric to the thresholds, the number of cell switch occurrences may be referred to as N.

In some implementations, the UE maintains two internal flag signals, a HST mode mobility signal and the consolidated HST mode configuration signal (denoted as the "HST CFG flag"). The HST flag calibration module 524 initiates the HST mode mobility signal to a value that corresponds to that of the consolidated HST mode configuration signal (e.g., HST_MOB_ML1=HST_CFG_ML1). The HST flag calibration module 524 then compares N to a first threshold (e.g., N1=2). If the HST flag calibration module 524 determines that N is equal to or greater than the first threshold (e.g., N>=N1), then the UE sets the HST mode mobility signal to a value equivalent to the consolidated HST mode configuration signal (e.g., HST_MOB_ML1=HST_CFG_ML1). In this regard, the UE will transition into the HST mode. In some aspects, the HST flag calibration module 524 compares N to a second threshold (e.g., N2=0). If the HST flag calibration module 524 determines that N is equal to or lesser than the second threshold, then the HST flag calibration module 524 may set the HST mode mobility signal to a second value that does not correspond to the consolidated HST mode configuration signal when the number of cell switch occurrences does not exceed the first threshold and does not exceed the second threshold. For example, the UE overrides the value of HST mode mobility signal to a value corresponding to a false alarm indication (e.g., HST_MOB_ML1=FALSE). In this regard, the UE will refrain from transitioning into the HST mode. Otherwise, if the HST flag calibration module 524 determines that N is not greater than the first threshold but exceeds the second threshold, then the UE keeps the HST mode mobility signal unchanged for hysteresis purposes by maintaining the HST mode mobility signal at a value that is unchanged from either the first value (e.g., HST_MOB_ML1=HST_CFG_ML1) or the second value (e.g., HST_MOB_ML1=FALSE).

The HST flag application module 526 can utilize the HST mode mobility signal indication towards mobility control of the UE. For example, the HST flag application module 526 can utilize the HST mode mobility signal as a true indication that the UE should transition into the HST mode to operate more efficiently and more robust in HST network deployment scenarios. In other aspects, the HST flag application module 526 may be, or at least in part, disabled if the signaling from the HST flag calibration module 524 indicates that the UE should not be transitioning into the HST mode. The HST flag application module 526 may utilize the HST mode mobility signal to improve control mobility of the UE. For example, while the UE is in a RRC idle mode, the UE may perform a schedule search and/or cell search measurements more frequently under the HST mode as channel quality conditions deteriorate faster when the UE is traveling at a higher rate of speed. The HST mode mobility signal may be utilized by the UE to transition into the HST mode and perform threshold adjustments for handover and cell reselection procedures to improve mobility HST performance by allowing the UE to perform cell reselection and/or handover with lesser complexity since the channel quality deteriorates relatively quicker under HST deployment scenarios.

Figure 6:
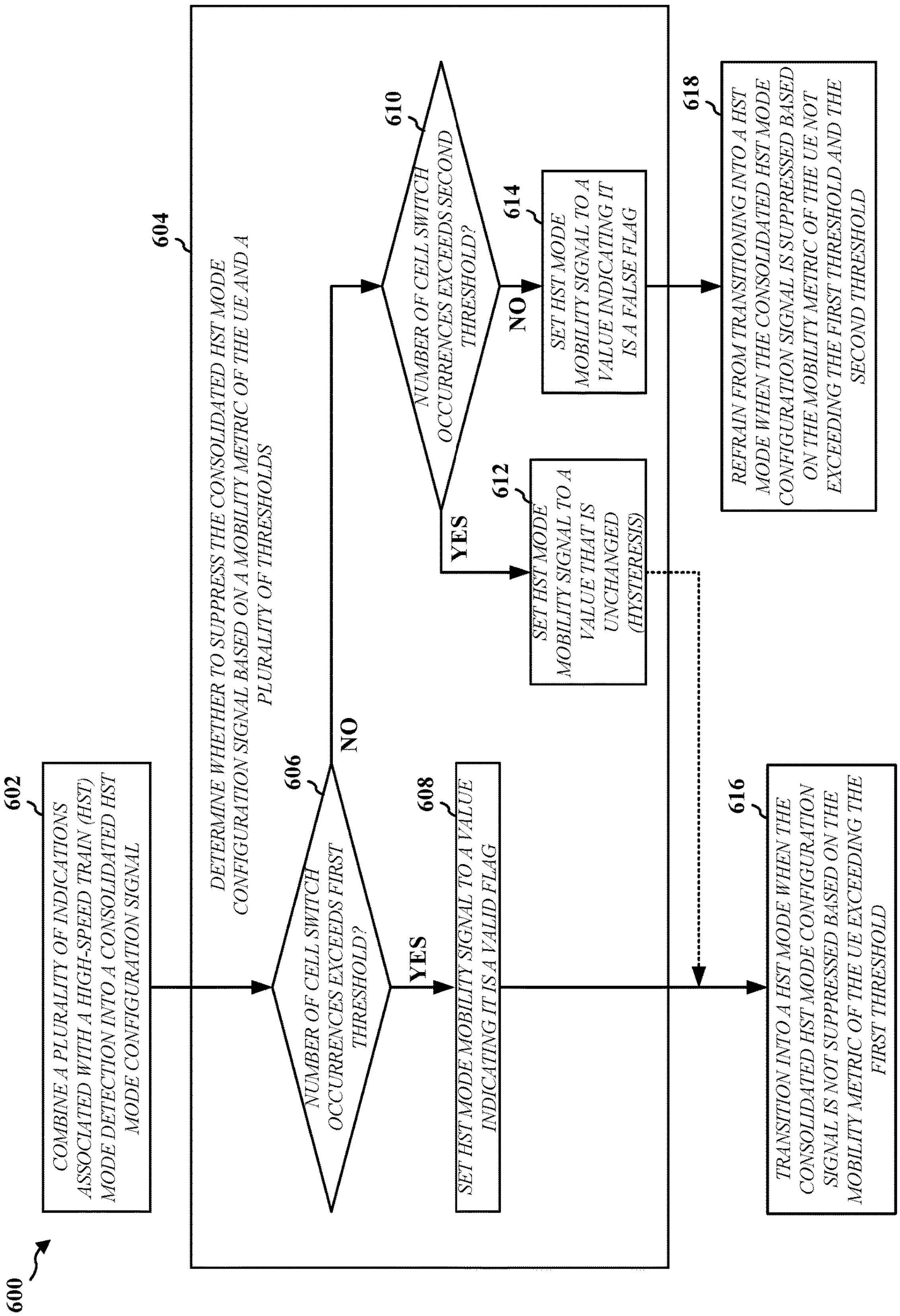
FIG. 6 is a flowchart of a method of wireless communication.

FIG. 6 is a flowchart of a process 600 of wireless communication. The method may be performed by a UE (e.g., the UE 104, 350, 404*a-b*; the apparatus 702). Optional aspects are illustrated in dashed lines. The process 600 allows a UE to consolidate the number of HST flags originating from multiple sources and suppressing any false alarms among the HST flags in order to robustly determine the HST mode when the UE is in fact in motion. As a result, false HST mode flags may be avoided and HST mode detection success rates and robustness may thereby be improved.

At 602, the UE combines a plurality of indications associated with a high-speed train mode detection into a consolidated HST mode configuration signal. For example, referring to FIG. 5, the UE may obtain multiple HST flags from different sources, of which may correspond respectively to the plurality of HST mode indications. The HST flags are received at a filter 512 in a layer 2 module 510 of the UE and pruned into a subset of HST flags for further processing at a HST flag distribution module 522 of a layer 1 module 520 of the UE. For example, the UE may receive the HST flags at a RRC sublayer of the UE. The UE (or a component of the UE) may consolidate the HST flags into a single HST flag by combining the HST mode indications into a consolidated HST mode configuration signal, for example, by receiving one or more HST flags, via downlink signaling, from base station 102/180, 310, 404*a-b* and combining the HST flags into a single HST flag. For instance, RX processor 356 of UE 350 may receive the HST flags from the base station through one or more antennas 352, and controller/processor 359 of UE 350 may combine the received HST flags into a single consolidated HST mode configuration signal.

At 604, the UE determines whether to suppress the consolidated HST mode configuration signal based on a mobility metric of the UE and a plurality of thresholds. For example, referring to FIG. 5, the HST flag calibration module 524 may determine whether to suppress the consolidated HST mode configuration signal by comparing the number of cell switch occurrences of the UE to different thresholds, including a first threshold that indicates the HST mode detection is valid if met. For instance, the controller/processor 359 of UE 350 may compare the number of cell switch occurrences of the UE to one or more thresholds in order to determine whether the consolidated HST mode configuration signal is a false alarm that should be suppressed. In some aspects, the mobility metric corresponds to a count value indicating the number of cell switch occurrences of the UE.

At 606, the UE determines whether the number of cell switch occurrences exceeds a first threshold. If the number of cell switch occurrences exceeds the first threshold, then the process 600 proceeds to block 608. Otherwise, the process 600 proceeds to block 610.

At 608, the UE may set a HST mode mobility signal to a value indicating it is a valid flag. For example, referring to FIG. 5, the HST flag calibration module 524 may set a HST mode mobility signal to a value indicating it is a valid flag by setting the HST mode mobility signal to a value that corresponds to that of the consolidated HST mode configuration signal. For instance, the controller/processor 359 of UE 350 may set the valid flag value for the HST mode mobility signal.

At 610, when the number of cell switch occurrences did not exceed the first threshold, the UE may determine whether the number of cell switch occurrences exceed a second threshold. For example, referring to FIG. 5, the HST flag calibration module 524 may compare the number of cell switch occurrences of the UE to the second threshold. For instance, the controller/processor 359 of UE 350 may compare the number of cell switch occurrences of the UE to the second threshold. If the number of cell switch occurrences exceeds the second threshold, then the process 600 proceeds to block 612. Otherwise, the process 600 proceeds to block 614.

At 612, the UE may set a HST mode mobility signal to a value that is unchanged from its immediate prior value. For example, referring to FIG. 5, the HST flag calibration module 524 may retain the value of the HST mode mobility signal for hysteresis. For instance, the controller/processor 359 of UE 350 may maintain the same value for the HST mode mobility signal.

At 614, the UE may set the HST mode mobility signal to a value indicating it is a false flag. For example, referring to FIG. 5, the HST flag calibration module 524 may set the HST mode mobility signal to a value indicating it is an invalid or improper signal. For instance, the controller/processor 359 of UE 350 may set the false flag value for the HST mode mobility signal.

At 616, the UE transitions into the HST mode when the consolidated HST mode configuration signal is not suppressed based on the mobility metric exceeding at least one of the thresholds (e.g., the number of cell switch occurrences exceeding the first threshold). In some aspects, the output of block 612 is fed to the input of block 616 for transitioning of the UE into the HST mode based on the HST mode mobility signal being left unchanged. For instance, the controller/processor 359 of UE 350 may transition the UE into the HST mode.

At 618, the UE refrains from transitioning into the HST mode when the consolidated HST mode configuration signal is suppressed based on the mobility metric not exceeding the first threshold and the second threshold. For instance, the controller/processor 359 of UE 350 may refrain from transitioning the UE into the HST mode. For example, referring to FIG. 5, the HST flag calibration module 524 may refrain from transitioning modes, such as into the HST mode, based on the two thresholds not being satisfied.

As described above, it would be helpful to avoid false alarms that falsely trigger the UE into an HST mode in order to improve the robustness of HST mode detection in non-HST UEs. Aspects of the present disclosure allow a UE to consolidate the number of HST flags originating from multiple sources and suppressing any false alarms among the HST flags in order to robustly determine the HST mode when the UE is in fact in motion. As a result, false HST mode flags may be avoided and HST mode detection success rates and robustness may thereby be improved.

Figure 7:
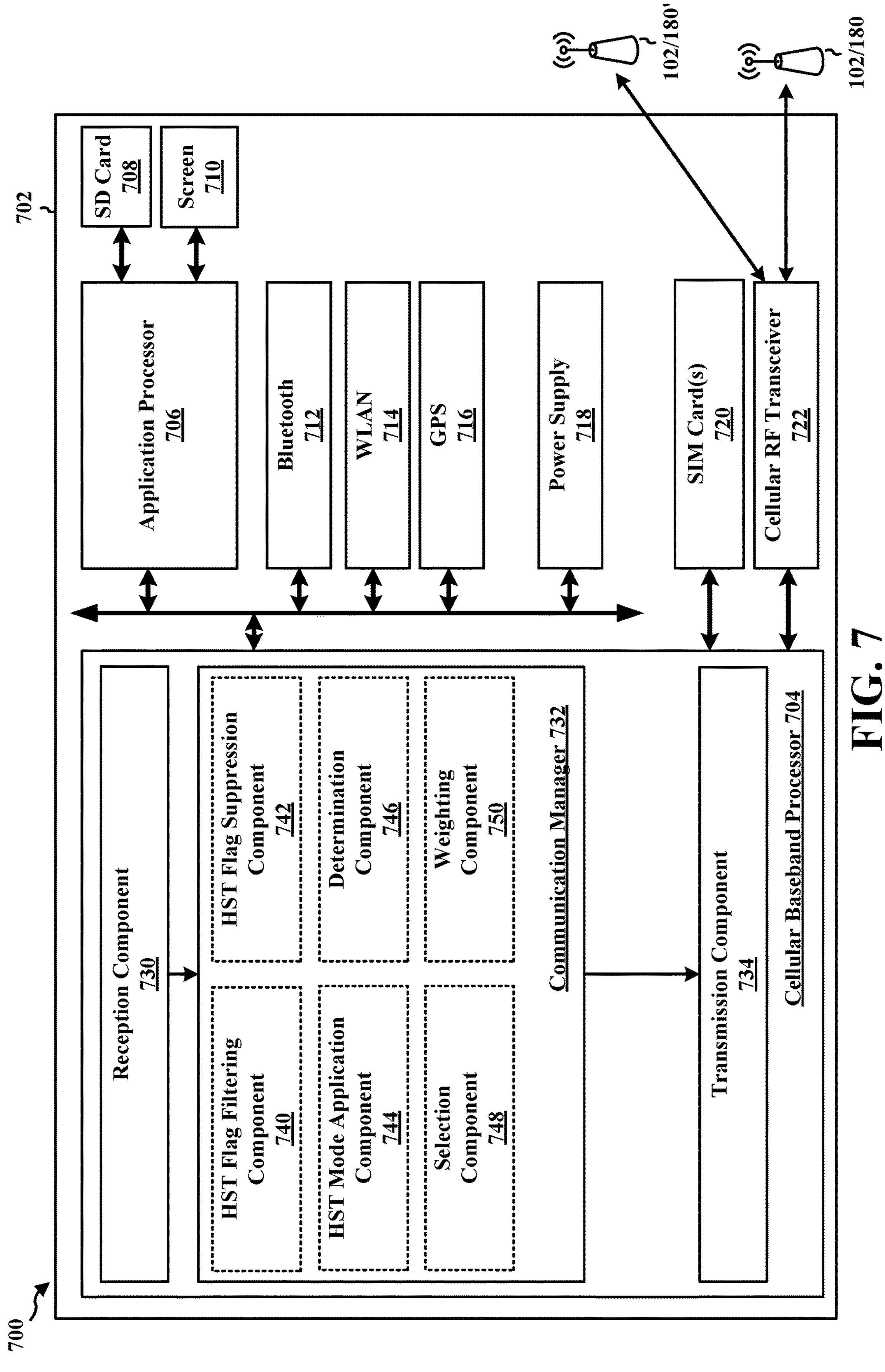
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 74 and/or BS 72/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes a HST flag filtering component 740 that is configured to receive, at a radio resource control sub-layer of the UE, a plurality of HST flags associated with the HST mode detection, and filter the plurality of HST flags into a subset of pruned HST flags by combining a plurality of indications associated with a high-speed train (HST) mode detection into a consolidated HST mode configuration signal, e.g., as described in connection with 602. The communication manager 732 also includes a HST flag suppression component 742 that is configured to determine whether to suppress the consolidated HST mode configuration signal based on a mobility metric of the UE and a plurality of thresholds, e.g., as described in connection with 604. For example, the HST flag suppression component 742 may determine whether the number of cell switch occurrences exceeds a first threshold, e.g., as described in connection with 606, and may set a HST mode mobility signal to a first value that corresponds to the consolidated HST mode configuration signal when the number of cell switch occurrences exceeds the first threshold, e.g., as described in connection with 608. In another example, the HST flag suppression component 742 may determine whether the number of cell switch occurrences exceeds a second threshold, e.g., as described in connection with 610, and may set the HST mode mobility signal to a second value that does not correspond to the consolidated HST mode configuration signal when the number of cell switch occurrences does not exceed the first threshold and does not exceed the second threshold, e.g., as described in connection with 614. In another example, the HST flag suppression component 742 may set the HST mode mobility signal to a value that is unchanged from an immediate prior value when the number of cell switch occurrences does not exceed the first threshold but exceeds the second threshold, e.g., as described in connection with 612. The communication manager 732 also includes a HST mode application component 744 that is configured to utilize the HST mode mobility signal to improve control mobility of the UE. For example, while the UE is in a RRC idle mode, the UE may perform a schedule search and/or cell search measurements more frequently under the HST mode as channel quality conditions deteriorate faster when the UE is traveling at a higher rate of speed. The communication manager 732 also includes a determination component 746 that is configured to determine whether to suppress the consolidated HST mode configuration signal by comparing the number of cell switch occurrences of the UE to different thresholds, e.g., as described in connection with 604. The communication manager 732 also includes a selection component 748 that is configured to select the one or more of the second subset of HST flags for inclusion into the subset of pruned HST flags when the timer is not expired. Otherwise, the UE will no longer consider the non-network HST flags valid upon expiry of the timer and are filtered out. For example, the UE may refrain from selecting one or more of the second subset of HST flags for inclusion into the subset of pruned HST flags when the timer is expired.

The communication manager 732 may further include a weighting component 750 that is configured to apply a weighting scheme between the network-based HST flags and non-network HST flags such that the UE selects between the network-based HST flags and the non-network HST flags for inclusion into the subset of pruned HST flags.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for combining a plurality of indications associated with a HST mode detection into a consolidated HST mode configuration signal. The apparatus 702, and in particular the cellular baseband processor 704, also includes means for determining whether to suppress the consolidated HST mode configuration signal based on a mobility metric of the UE and a plurality of thresholds. The apparatus 702, and in particular the cellular baseband processor 704, further includes means for transitioning into a HST mode when the consolidated HST mode configuration signal is not suppressed based on the mobility metric of the UE exceeding at least one of the plurality of thresholds.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In some access networks, UE may be used in some scenarios in which the UE is highly mobile—that is, the UE may be traveling at a high rate of speed, such as in a train, helicopter, automobile, etc., such that the geographic location of the UE may be changing relatively rapidly. For example, a UE be present on a train in which network access is available through HST deployments (although other similar deployments are possible without departing from the scope of the present disclosure). One scenario in which UE modem performance may be observed are in HST deployments. An HST deployment is a critical area for modem performance.

HSTs have recently developed as fast, convenient, environmentally friendly, and flexible means of transportation. As more and more passengers carrying UEs tend to travel on HSTs, new challenges have arisen in providing reliable communication services to accommodate growing communication demands. For example, typical HSTs may travel at speeds upwards of 200 kilometers per hour (km/h) or even upwards of 350 km/h, resulting in frequent and fast handovers, large Doppler spreads, and other effects. In attempt to overcome these challenges, millimeter-wave (mmW) and massive multiple-input multiple output (MIMO) technologies, as well as coordinated multipoint (CoMP) and mobile relay station architectures, have been considered for HST deployments.

A UE may have different design algorithms tailored for different HST deployment scenarios and, hence, the UE may need some form of HST indications to trigger the UE to transition into an HST mode and operate properly within an HST deployment scenario. These indications may originate from a network as downlink flags, or in the absence of flags, the UE may have internal means to determine the HST indications.

However, notwithstanding such technologies, conventional HST deployments may still be insufficient in covering all possible scenarios that may arise in HSTs, including the modem performance described above. There are use cases where a UE camps on an HST cell (e.g., cells served by base stations located in or on a HST); however, the UE is not in motion (i.e., the UE is not traveling at a high rate of speed, as on an HST). Rather, the UE is in a stationary position (e.g., the UE is located in a waiting room of a train station or located by the side of an HST track), where the HST flags falsely trigger the UE to transition into the HST mode. For example, UEs that are located outside or away from a HST (referred to herein as non-HST UEs) may be camped on HST cells. As these HST cells have originally been designed to support UEs that are located in or on a HST (referred to herein as HST UEs), the base stations serving these HST cells may send HST indications to non-HST UEs that falsely trigger the UE to transition into the HST mode. Hence, it would be helpful to avoid false alarms that falsely trigger the UE into an HST mode in order to improve the robustness of HST mode detection in non-HST UEs.

Aspects of the present disclosure allow a UE to consolidate the number of HST flags originating from multiple sources and suppressing any false alarms among the HST flags in order to robustly determine the HST mode when the UE is in fact in motion. As a result, false HST mode flags may be avoided and HST mode detection success rates and robustness may thereby be improved.

The following examples are illustrative only and may be combined with aspects of other embodiments or teachings described herein, without limitation.

Aspect 1 is a method of wireless communication performed by a user equipment (UE) that includes combining a plurality of indications associated with a high-speed train (HST) mode detection into a consolidated HST mode configuration signal; determining whether to suppress the consolidated HST mode configuration signal based on a mobility metric of the UE and a plurality of thresholds; and transitioning into a HST mode when the consolidated HST mode configuration signal is not suppressed based on the mobility metric of the UE exceeding at least one of the plurality of thresholds.

In Aspect 2, the method of Aspect 1 further includes receiving, at a radio resource control sub-layer of the UE, a plurality of HST flags associated with the HST mode detection; filtering the plurality of HST flags into a subset of pruned HST flags, wherein the subset of pruned HST flags respectively correspond to the plurality of indications associated with the HST mode detection; and sending, to a physical layer sub-layer of the UE, the subset of pruned HST flags.

In Aspect 3, the method of Aspect 2 further includes that the plurality of HST flags comprises a first subset of HST flags associated with downlink signaling from a base station and a second subset of HST flags associated with one or more HST detection schemes performed at the UE.

In Aspect 4, the method of Aspect 3 further includes determining whether the second subset of HST flags are considered valid based on a status of a timer, wherein the filtering comprises refraining from selecting one or more of the second subset of HST flags for inclusion into the subset of pruned HST flags upon expiry of the timer.

In Aspect 5, the method of Aspect 4 further includes selecting the one or more of the second subset of HST flags for inclusion into the subset of pruned HST flags when the timer is not expired.

In Aspect 6, the method of Aspect 3 further includes applying a weighting scheme between the first subset of HST flags and the second subset of HST flags; and selecting one or more HST flags between the first subset of HST flags and the second subset of HST flags based on the weighting scheme for inclusion into the subset of pruned HST flags, wherein the subset of pruned HST flags comprises the selected one or more HST flags.

In Aspect 7, the method of any of Aspects 1-6 further includes that the determining further comprises determining a number of cell switch occurrences of the UE over a predefined duration of time based on a handover of the UE or a cell reselection, wherein the mobility metric comprises a count value indicating the number of cell switch occurrences of the UE.

In Aspect 8, the method of Aspect 7 further includes determining whether the number of cell switch occurrences exceeds a first threshold; and setting a HST mode mobility signal to a first value that corresponds to the consolidated HST mode configuration signal when the number of cell switch occurrences exceeds the first threshold, wherein the transitioning into the HST mode occurs in response to the HST mode mobility signal being set to the first value.

In Aspect 9, the method of Aspect 8 further includes determining whether the number of switch occurrences exceeds a second threshold smaller than the first threshold; setting the HST mode mobility signal to a second value that does not correspond to the consolidated HST mode configuration signal when the number of cell switch occurrences does not exceed the first threshold and does not exceed the second threshold; and refraining from transitioning into the HST mode based on the HST mode mobility signal being set to the second value.

In Aspect 10, the method of Aspect 9 further includes maintaining the HST mode mobility signal at a value that is unchanged from either the first value or the second value when the number of cell switch occurrences does not exceed the first threshold and exceeds the second threshold.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
combining a plurality of indications associated with a high-speed train (HST) mode detection into a consolidated HST mode configuration signal, wherein the consolidated HST mode configuration signal comprises a single HST flag; and
transitioning into a HST mode based on the consolidated HST mode configuration signal, a mobility metric of the UE, and one or more thresholds.

2. The method of claim 1, wherein the mobility metric indicates a number of cell switch occurrences of the UE over a duration of time.

3. The method of claim 1, wherein the transitioning to the HST mode is further based on a comparison of the mobility metric to the one or more thresholds.

4. The method of claim 1, further comprising:
determining a number of cell switch occurrences of the UE over a duration of time based on a handover of the UE or a cell reselection, the mobility metric indicating the number of cell switch occurrences of the UE;
determining whether the number of cell switch occurrences exceeds a first threshold of the one or more thresholds; and
setting a HST mode mobility signal to a first value that corresponds to the consolidated HST mode configuration signal when the number of cell switch occurrences exceeds the first threshold, wherein the transitioning into the HST mode occurs in response to the HST mode mobility signal being set to the first value.

5. The method of claim 4, further comprising:
determining whether the number of cell switch occurrences exceeds a second threshold of the one or more thresholds smaller than the first threshold;
setting the HST mode mobility signal to a second value that does not correspond to the consolidated HST mode configuration signal when the number of cell switch occurrences does not exceed the first threshold and does not exceed the second threshold; and
refraining from transitioning into the HST mode based on the HST mode mobility signal being set to the second value.

6. The method of claim 5, further comprising maintaining the HST mode mobility signal at a value that is unchanged from either the first value or the second value when the number of cell switch occurrences does not exceed the first threshold and exceeds the second threshold.

7. The method of claim 1, further comprising:
receiving, at a radio resource control sub-layer of the UE, a plurality of HST flags associated with the HST mode detection;
filtering the plurality of HST flags into a subset of pruned HST flags, wherein the subset of pruned HST flags respectively correspond to the plurality of indications associated with the HST mode detection; and
sending, to a physical layer sub-layer of the UE, the subset of pruned HST flags.

8. The method of claim 7, wherein the plurality of HST flags comprises a first subset of HST flags associated with downlink signaling from a base station and a second subset of HST flags associated with one or more HST detection schemes performed at the UE.

9. The method of claim 8, further comprising determining whether the second subset of HST flags are considered valid based on a status of a timer, wherein the filtering comprises refraining from selecting one or more of the second subset of HST flags for inclusion into the subset of pruned HST flags upon expiry of the timer.

10. The method of claim 9, further comprising selecting the one or more of the second subset of HST flags for inclusion into the subset of pruned HST flags when the timer is not expired.

11. The method of claim 8, further comprising:
applying a weighting scheme between the first subset of HST flags and the second subset of HST flags; and
selecting one or more HST flags between the first subset of HST flags and the second subset of HST flags based on the weighting scheme for inclusion into the subset of pruned HST flags, wherein the subset of pruned HST flags comprises the selected one or more HST flags.

12. An apparatus for wireless communication at a user equipment (UE), the apparatus comprising:
at least one processor; and
a memory, coupled to the at least one processor, storing computer-executable code, which when executed by the at least one processor, causes the apparatus to:
combine a plurality of indications associated with a high-speed train (HST) mode detection into a consolidated HST mode configuration signal, wherein the consolidated HST mode configuration signal comprises a single HST flag; and transition into a HST mode based on the consolidated HST mode configuration signal, a mobility metric of the UE, and one or more thresholds.

13. The apparatus of claim 12, wherein the mobility metric indicates a number of cell switch occurrences of the UE over a duration of time.

14. The apparatus of claim 12, wherein the transition to the HST mode is further based on a comparison of the mobility metric to the one or more thresholds.

15. The apparatus of claim 12, wherein the code, which when executed by the at least one processor, further causes the apparatus to:

determine a number of cell switch occurrences of the UE over a duration of time based on a handover of the UE or a cell reselection, the mobility metric indicating the number of cell switch occurrences of the UE;

determine whether the number of cell switch occurrences exceeds a first threshold of the one or more thresholds; and set a HST mode mobility signal to a first value that corresponds to the consolidated HST mode configuration signal when the number of cell switch occurrences exceeds the first threshold, wherein the transition into the HST mode occurs in response to the HST mode mobility signal being set to the first value.

16. The apparatus of claim 15, wherein the code, which when executed by the at least one processor, further causes the apparatus to:

determine whether the number of cell switch occurrences exceeds a second threshold of the one or more thresholds smaller than the first threshold;

set the HST mode mobility signal to a second value that does not correspond to the consolidated HST mode configuration signal when the number of cell switch occurrences does not exceed the first threshold and does not exceed the second threshold; and refrain from transitioning into the HST mode based on the HST mode mobility signal being set to the second value.

17. The apparatus of claim 16, wherein the code, which when executed by the at least one processor, further causes the apparatus to:

maintain the HST mode mobility signal at a value that is unchanged from either the first value or the second value when the number of cell switch occurrences does not exceed the first threshold and exceeds the second threshold.

18. The apparatus of claim 12, wherein the code, which when executed by the at least one processor, further causes the apparatus to:

receive, at a radio resource control sub-layer of the UE, a plurality of HST flags associated with the HST mode detection;

filter the plurality of HST flags into a subset of pruned HST flags, wherein the subset of pruned HST flags respectively correspond to the plurality of indications associated with the HST mode detection; and send, to a physical layer sub-layer of the UE, the subset of pruned HST flags;

wherein the plurality of HST flags comprises a first subset of HST flags associated with downlink signaling from a base station and a second subset of HST flags associated with one or more HST detection schemes performed at the UE.

19. The apparatus of claim 18, wherein the code, which when executed by the at least one processor, further causes the apparatus to determine whether the second subset of HST flags are considered valid based on a status of a timer, wherein the code, which when executed by the at least one processor, causing the apparatus to filter further causes the apparatus to refrain from selecting one or more of the second subset of HST flags for inclusion into the subset of pruned HST flags upon expiry of the timer.

20. The apparatus of claim 19, wherein the code, which when executed by the at least one processor, further causes the apparatus to select the one or more of the second subset of HST flags for inclusion into the subset of pruned HST flags when the timer is not expired.

21. The apparatus of claim 18, wherein the code, which when executed by the at least one processor, further causes the apparatus to:

apply a weighting scheme between the first subset of HST flags and the second subset of HST flags; and select one or more HST flags between the first subset of HST flags and the second subset of HST flags based on the weighting scheme for inclusion into the subset of pruned HST flags, wherein the subset of pruned HST flags comprises the selected one or more HST flags.

22. A non-transitory computer-readable medium storing computer executable code, which when executed by at least one processor, causes the at least one processor to:

combine a plurality of indications associated with a high-speed train (HST) mode detection into a consolidated HST mode configuration signal, wherein the consolidated HST mode configuration signal comprises a single HST flag; and transition into a HST mode based on the consolidated HST mode configuration signal, a mobility metric of a user equipment (UE), and one or more thresholds.

23. The non-transitory computer-readable medium of claim 22, wherein the mobility metric indicates a number of cell switch occurrences of the UE over a duration of time.

24. The non-transitory computer-readable medium of claim 22, wherein the transition to the HST mode is further based on a comparison of the mobility metric to the one or more thresholds.

25. The non-transitory computer-readable medium of claim 22, wherein the code, which when executed by the at least one processor, further causes the at least one processor to:

determine a number of cell switch occurrences of the UE over a duration of time based on a handover of the UE or a cell reselection, the mobility metric indicating the number of cell switch occurrences of the UE;

determine whether the number of cell switch occurrences exceeds a first threshold of the one or more thresholds; and set a HST mode mobility signal to a first value that corresponds to the consolidated HST mode configuration signal when the number of cell switch occurrences exceeds the first threshold, wherein the transitioning into the HST mode occurs in response to the HST mode mobility signal being set to the first value.

26. The non-transitory computer-readable medium of claim 25, wherein the code, which when executed by the at least one processor, further causes the at least one processor to:

determine whether the number of cell switch occurrences exceeds a second threshold of the one or more thresholds smaller than the first threshold;

set the HST mode mobility signal to a second value that does not correspond to the consolidated HST mode configuration signal when the number of cell switch occurrences does not exceed the first threshold and does not exceed the second threshold; and refrain from transitioning into the HST mode based on the HST mode mobility signal being set to the second value.

27. The non-transitory computer-readable medium of claim 26, wherein the code, which when executed by the at least one processor, further causes the at least one processor to:

maintain the HST mode mobility signal at a value that is unchanged from either the first value or the second value when the number of cell switch occurrences does not exceed the first threshold and exceeds the second threshold.

* * * * *